United States Patent [19]
Lacour et al.

[11] Patent Number: 5,951,808
[45] Date of Patent: Sep. 14, 1999

[54] METHOD FOR PRODUCING HIGH DIMENSIONAL PRECISION COMPOSITE ELEMENTS USING IONIZATION POLYMERIZATION AND ELEMENTS PRODUCED BY SAID METHOD

[75] Inventors: Dominique Lacour, Tresses; Sylvie His, Bruges; François Raut, Bordeaux; Christian Desaguiler, Conflans Ste Honorine; Nathalie Chieusse, Aubergenville, all of France

[73] Assignee: Societe Nationale Industrielle et Aerospatiale, Paris Cedex, France

[21] Appl. No.: 08/790,896

[22] Filed: Jan. 29, 1997

[30] Foreign Application Priority Data

Jan. 29, 1996 [FR] France .................... 96 01315

[51] Int. Cl.$^6$ .................................................. B32B 31/28
[52] U.S. Cl. .................. 156/273.7; 156/212; 156/275.5; 156/275.7; 156/285; 156/307.1
[58] Field of Search .................... 156/285, 275.5, 156/275.7, 273.7, 272.2, 212, 221, 332, 307.1, 286

[56] References Cited

U.S. PATENT DOCUMENTS

| | | | |
|---|---|---|---|
| 3,616,028 | 10/1971 | Miller | 156/275.5 |
| 3,660,217 | 5/1972 | Kehr et al. | 156/275.5 |
| 3,930,098 | 12/1975 | Araki et al. | |
| 3,936,414 | 2/1976 | Wright et al. | 523/517 |
| 4,216,047 | 8/1980 | Hilliard et al. | 156/285 |
| 4,789,505 | 12/1988 | Beizers . | |
| 5,283,099 | 2/1994 | Smith et al. | 428/116 |
| 5,354,195 | 10/1994 | Dublinski et al. | 156/285 |
| 5,416,173 | 5/1995 | Gagliani et al. | 525/526 |
| 5,635,013 | 6/1997 | Boi | 156/285 |

FOREIGN PATENT DOCUMENTS

| | | |
|---|---|---|
| 036391 | 9/1981 | European Pat. Off. . |
| 312167 | 4/1989 | European Pat. Off. . |
| 514351 | 11/1992 | European Pat. Off. . |
| 558366 | 9/1993 | European Pat. Off. . |
| 165118 | 12/1995 | European Pat. Off. . |
| 2564029 | 11/1985 | France . |
| 2693465 | 1/1992 | France . |
| 2698636 | 6/1994 | France . |
| 58-038096 | 3/1983 | Japan . |

OTHER PUBLICATIONS

An English Language Abstract of JP 58–038,096.
A French Search Report of FR 9,601,315.

*Primary Examiner*—Michael W. Ball
*Assistant Examiner*—Michael A Tolin
*Attorney, Agent, or Firm*—Young & Thompson

[57] ABSTRACT

A method for producing a high dimensional precision composite element using ionization polymerization and an element made by such method. The element includes a support panel flanked on at least one side with a skin fixed by an adhesive resin and including at least one lap of organic or mineral fibers and an organic linking matrix. The method includes placing at least one lap of fibers preimpregnated with an ionization polymerizable resin on a mold to form the skin, the mold having a predetermined shape and dimensions for the element to be produced; placing a film of an ionization polymerizable adhesive resin on the skin; placing the support panel on the film to form a skin/film/panel unit, the support panel having a predetermined thickness; compacting the skin/film/panel unit; and polymerizing the polymerizable resins during the compacting by subjecting the skin/film/panel unit to ionization.

51 Claims, 1 Drawing Sheet

Vacuum

METHOD FOR PRODUCING HIGH DIMENSIONAL PRECISION COMPOSITE ELEMENTS USING IONIZATION POLYMERIZATION AND ELEMENTS PRODUCED BY SAID METHOD

BACKGROUND OF THE INVENTION

1. Field of the Invention

The present invention concerns the production of large composite elements requiring high dimensional precision.

More particularly, the invention is intended to produce elements formed of a support panel flanked on one or both sides of a carbon skin mounted by means of glueing, the aim of the invention being to obtain large light elements possessing high dimensional precision and extreme rigidity at a moderate cost.

2. Description of Background and Relevant Information

The sphere of application of the invention naturally concerns machines or structures intended to be placed in orbit around the Earth or launched into space, but also aeronautics in general, as well as maritime applications (boat structures or elements, such as hulls, for example).

The structural elements of the above-mentioned type, namely a panel flanked on one or both sides of a skin formed of one or several fiber laps preimpregnated with a thermosetting resin, each skin being fixed to the support panel with the aid of an adhesive resin, are generally produced in two stages: stratification of the skin(s) and hardening of the assembly adhesive. These two stages shall each involve a polymerization process, the two polymerization phases being carried out either consecutively by a traditional baking technique, or simultaneously, the polymerization of the preimpregnation resin of the fibers and the adhesive resin being effected by co-baking.

In this latter case, the support panel and the skin(s) is/are placed in a suitably shaped mold and all the above are placed in an autoclave so as to polymerize the resins under high pressure and at a high temperature.

The production by this technique of large elements poses several problems.

Firstly, the normal size of the autoclaves limits that of the molds able to be introduced into the latter and thus that of the elements able to be produced, unless of course special autoclaves are manufactured, this proving to be expensive.

Secondly, the temperatures implemented in this thermal polymerization are about between 160 and 180° C. resulting in risks of internal stresses, microcracking and delamination, as well as the risks caused by the size of the elements of deformation by means of expansion, these risks requiring that resort may be made to using molds made of a material having an extremely low coefficient of heat expansion, such as materials made of invar or graphite which are expensive.

In addition, owing to the weights present and the heterogeneity of the element, a problem occurs concerning the progression of the thermal flow inside the unit to be polymerized, which renders it extremely difficult to control the thermal isotropy of the polymerization process. Finally, these thermal restraints result in working with slow temperature rises, which clearly adversely affect the cost of the operation.

Apart from its high cost, thermal co-baking thus results in obtaining less effective performances, especially as regards the precision of the shape characterized by the parameter normally known as the RMS (Root Mean Square).

Instead of a thermal co-baking or hot polymerization, it is possible to carry out an ionization co-polymerization whose principle is well-known and is known as cold polymerization owing to the induced temperature rises limited to about 80° C.

There are certain advantages in this polymerization as regards its speed of implementation, its effectiveness and the weak thermal stresses imposed on the materials. It can be applied quite naturally to elements or objects possibly having large dimensions and does not lead to dimensional variations of the irradiated elements. However, the known applications of this technique, as in the European patent N°0.165.118 granted in the name of the Applicant, mainly concern the simple irradiation of complete composite elements already embodied so as to harden the resins forming part of the composition of said elements. This irradiation is not used during the method for producing the element to its desired shapes and sizes, but subsequently and in normal or ambient pressure and temperature conditions.

Furthermore, polymerization by ionization does pose certain problems concerning the behavior of the resins.

In fact, from the start of this polymerization, the resin stiffens and does not pass through the virtually fluidity state it reaches in conventional thermal polymerization, which adversely affects a good diffusion, especially in the fiber intersite spaces.

SUMMARY OF THE INVENTION

The present invention concerns a method for producing elements made of a composite material and having high dimensional precision and makes use of a polymerization by ionization and more particularly of elements formed of a support panel flanked on one or both sides of a skin fixed by an adhesive resin and including at least one lap of mineral or organic fibers and an organic linking matrix, the method including:

laying down on a mold having a shape and dimensions for the element to be embodied at least one lap of fibers preimpregnated with an ionization polymerizable resin so as to embody the first or sole skin;

coating the first skin with a film of an ionization polymerizable adhesive resin;

coating the film of a panel at one or several glued portions with a suitable thickness;

compacting the first skin/film/panel unit possibly forming and then compacting a second skin including at least one lap of preimpregnated fibers, a film of ionization polymerizable adhesive resin being inserted between the skin and the panel;

and finally carrying out an ionization polymerization during compacting of the first skin/film/panel unit or of the first skin/film/panel/second skin unit.

This method is able to embody panel, partition, hull, flat or curved, caisson type structures, etc., with possibly large dimensions and having remarkable qualities as regards their mechanical behavior, their rigidity, dimensional precision, lightness and relatively low cost price resulting in particular from the reduction of production times and the possibility of using larger molds made of materials less expensive than invar or graphite, such as soft steel or an aluminum alloy owing to the slight rises of temperatures observed during polymerization.

In particular, the joint use of an ionization polymerization and a compacting makes it possible to obtain extremely good homogeneity of the matrix for linking the fibers of the skins with a low rate of porosity and an extremely good adhesive quality between the support panel and the skins, the method being specially fully suitable for the embodiment of complex structures involving both the forming of fiber linking matrix and the fixing by glueing of portions of the structure having a different nature.

According to modes for implementing the method of the invention, the fibers could be high modulus carbon fibers or glass fibers, silica fibers, silicon carbide fibers or aramid fibers, such as Kelvar, and each lap could be formed by the placing side-by-side of breadths of preimpregnated unidirectional fibers. Each skin could have several superimposed laps, with a right angle crossing of the fibers of a lap with respect to the fibers of an adjacent lap. If it is desired to strengthen the surface quality or mechanical resistance of the skin placed against the mold, it is possible to either compact the first lap of this skin or all the laps of the skin. Compacting, especially for large elements, shall preferably be carried out under vacuum. The impregnation resin of the fibers and the adhesive resin could be the same and selected from the group of acrylic or polysilane-based resins able to be polymerized by ionization.

The skin support panel could be formed of a honeycomb type alveolar structure made of aluminum or another light compression-resistant structure made of a cellular material, such as a carbon or phenolic foam.

The invention also concerns any support panel+ skin(s) structure of the above-mentioned type obtained in accordance with the method defined earlier.

BRIEF DESCRIPTION OF THE DRAWINGS

Other characteristics and advantages shall appear more readily from a reading of the following description of an embodiment of said method, said description being given solely by way of example with reference to the accompanying drawings on which.

DETAILED DESCRIPTION OF THE PREFERRED EMBODIMENTS

Figure 1:
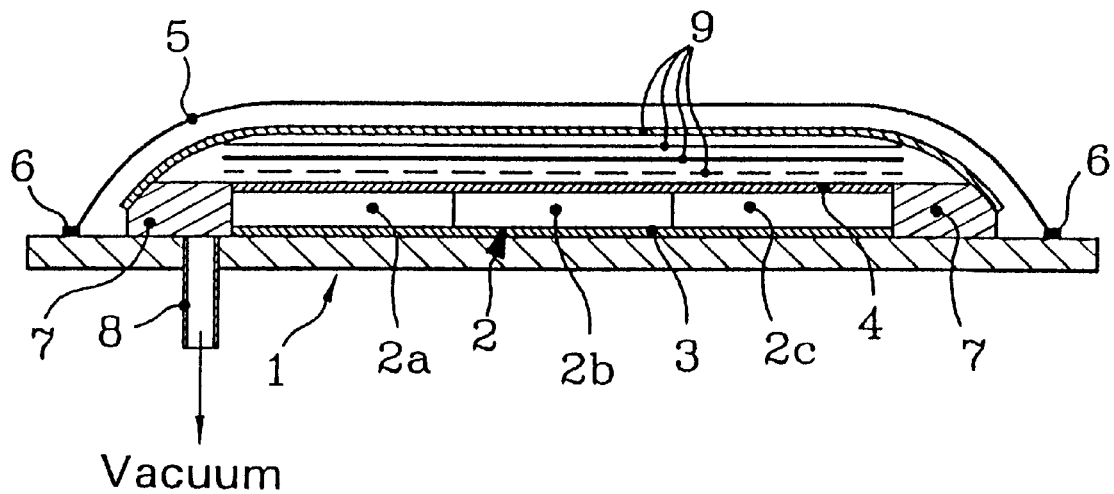
FIG. 1 is a sectional diagrammatic view of a sandwich type structure according to the invention and placed in a mold placed under a bladder.

FIG. 1 diagrammatically represents a section of a mold in which a sandwich structure formed of a central core flanked on both sides of a skin has been placed, the structure being covered with a bladder placed under a vacuum.

More specifically, the mold includes a plate 1 whose upper face for receiving the sandwich structure is dimensioned and configured according to the element to be embodied.

Generally speaking, this element shall be of the panel, hull, partition, caisson or similar type and has a central core 2 with possibly an even thickness formed, for example, of a honeycomb type alveolar structure with a suitable thickness, the structure being flanked on both sides with a skin 3, 4 made of a composite material.

The central core 2 may be an aluminum honeycomb with a thickness of 25 mm and whose cell axis is perpendicular to the plane of the skins 3, 4.

The skins 3, 4 are each formed of several laps of preimpregnated unidirectional fibers. In the described and shown embodiment, the mold plate 1 is flat but could be curved inward, concave or convex and according to any curve as a function of the morphology of the element to be embodied. The upper surface of the mold 1 could also be formed with flat or curved inward facets.

After preparation of the mold according to normal techniques, a first lap of fibers is laid down onto the upper face of the mold, the lap being made of high modulus carbon fibers preimpregnated with an acrylic resin able to be polymerized by ionization. M55J type fibers sold by the TORAY company are particularly suitable.

Laying down is effected by placing side by side breadths several centimeters wide, the fibers being orientated longitudinally to the breadths. Several identical laps are preferably superimposed so as to form the first skin 3, the breadths preferably being crossed at a right angle of one lap to the next one.

If it is desired to provide the visible face of the skin with a high quality surface finish, after placing, the first lap of the skin 3 can be compacted under vacuum according to the usual technique. To this effect, after having covered the lap with conventional protective films and the placing of a bladder, such as the bladder 5 of FIG. 1 fixed to the plate 1 and sealed on its periphery by mastic 6 and edge rulers similar to the rulers 7 of FIG. 1, a vacuum is made in the space between the lap 3 and the bladder 5 by means of a pipe 8 connected to a suitable vacuum source (not shown). A vacuum corresponding to an absolute pressure lower than or equal to about 0.02 MPa is applied for about twelve hours at ambient temperature.

The successive laps of the skin 3 are then placed by means of laying down without being compacted. However, once the total number of laps has been laid down, if it is desired to strengthen the mechanical qualities of the skin embodied, the latter shall be subjected to a compacting under vacuum in accordance with the same conditions as for the first lap.

The adhesive resin, which preferably is of the same nature as the resin for impregnating the fibers of the skins 3, 4, is then deposited on the first skin 3 in the form of a lap formed of joined strips.

The honeycomb structure, formed of a panel made up of a single piece or, as shown on FIG. 1, of several joined portions 2a, 2b, 2c, is then placed on the embodied adhesive film (not shown).

The first skin/film/honeycomb unit is then compacted under vacuum in accordance with the same conditions as indicated earlier.

The purpose of this compacting is to force the lap fiber impregnation resin and adhesive resin to flow into the fiber intersite spaces so as to take account of the ionization polymerization effects, as shall be seen subsequently.

Next, an adhesive film is inserted between the honeycomb 2 and the upper skin 4. To this effect, as the upper face of the honeycomb is unsuitable for supporting the adhesive film, the latter is placed on the face of the first lap of the skin 4 intended to be placed against the honeycomb.

The characteristics of this second adhesive film are similar to those of the first film.

More specifically, each breadth of the first lap shall be coated with a film strip and then laid down on the honeycomb so as to constitute the first lap.

The laps of the skin 4 are identical to those of the skin 3 and placed according to the same laying down method, except that the first lap is not compacted. It is to be noted that the arrangement of the skins shall preferably be made according to a mirror structure, the laps of the same row from the central core of the skins 3 and 4 being laid down in the same way.

As shown in FIG. 1, once the skin 4 has been embodied, the edge rulers 7, the coatings or usual protective films 9 (peeling off fabric, resin barrier, pressure distributor, drainage of gases) and finally the bladder 5 are placed.

The sandwich 2, 3, 4 is then compacted under a vacuum corresponding to an absolute pressure lower than or equal to about 0.04 MPa for a period of several hours, such as five, before the unit, still under a vacuum, is subjected to an ionization polymerization with the aid of an X-ray or an electronic bombardment.

To this effect, the entire sandwich 2,3,4 is subjected to one or preferably several passages in front of a 10 MeV electron accelerator with a power of 20 Kw with the use of a conversion target when using X-rays, as described in the document FR-A-2 564 029.

The bombardment or irradiation conditions, number of passages, run off speed in front of the accelerator gun, and doses on each passage are determined so that all the resin of the fibers and adhesive films receive an appropriate bombardment or irradiation dose, such as 100 KGy. This dose shall preferably be applied by carrying out several minimal dose passages separated by time intervals so as to limit heating inside the composite material and the metallic mold 1. Generally and by way of indication, the bombardment or irradiation doses may range from 5 to 300 KGy. The control of irradiation or bombardment depends on various factors, such as the nature of the resin, the morphology and dimensions of the element to be embodied.

Throughout the polymerization period, which only lasts several minutes, the vacuum is maintained in the mold 1.

Once the irradiation or bombardment has ended and the temperature of the composite material has returned to the ambient value, that is about 25° C., the vacuum is cut off and the mold is opened to remove the finished element.

Compacting, not merely during irradiation or bombardment but when preparing for this operation, as in compacting of the first skin/adhesive film/honeycomb unit, is required to compensate the particular effects on the resins of the ionization polymerization.

In fact, from the start of this polymerization process, the resin stiffens and does not reach the virtually liquid fluidity state it reaches in traditional thermal polymerization. This is why, in accordance with the invention, the compactings are carried out in the conditions indicated.

Generally speaking, the various compactings are carried out with the most powerful vacuum compatible with the nature of the materials present.

However, it is to be noted that the vacuum implemented at the time of final compacting is less than that of the preceding compactings so as to limit the telegraphing phenomenon of the upper skin 4 inside the alveoles of the honeycomb 2.

The joint use of an ionization polymerization and a compacting thus make it possible to obtain extremely good homogeneity of the skin fiber linking matrix with a low rate of porosity and an extremely good quality of the adhesive link between the honeycomb and the skins.

Figure 2:
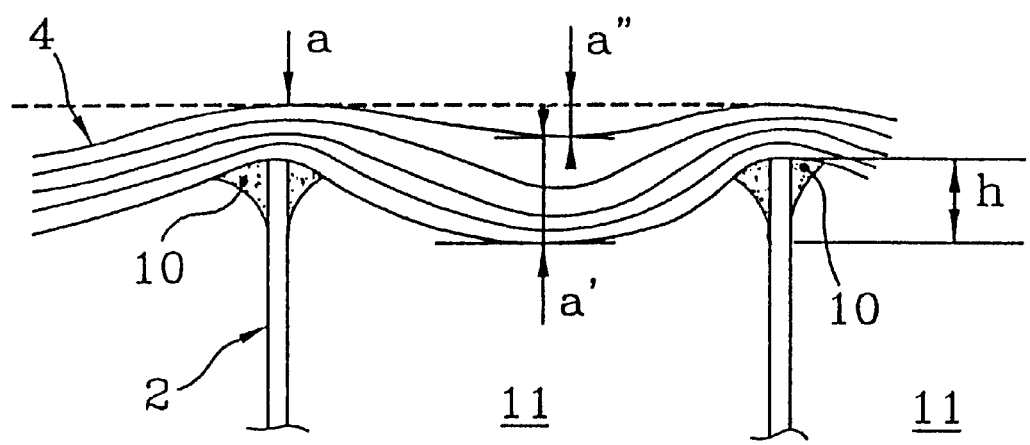
FIG. 2 is a partial cutaway view of a structure according to the invention at the height of the links between the central core and one of the skins.

A microscopic examination of the links between the honeycomb 2 and the skins 3,4 of such an element shows, as illustrated by the micrographical section of FIG. 2, a good adhesive coupling 10 at the level of the cell foot of the honeycomb 2 between the latter and the first lap of the skin 4, the coupling resulting in having an optimum height h of the menisci, which ensures a better transfer of the forces between the skin and the honeycomb, a good compacting a' of the skin 4 at the level of the feet of the cells, a good volume swell a' of the fibers of the laps of the skin 4 in the axis of the cells 11 and a reduced "telegraphing" a" (amplitude of the mismatch of the skin 4 in the axis of cells consecutive to a placing under vacuum). These parameters are indicators of a particularly effective link between the honeycomb and the skins.

The method is moreover advantageous from the economic point of view as it allows the use of a metal or alloy as a material for the mold 1, such as soft steel or an aluminum alloy which is much cheaper than invar or graphite. The slight temperature rises observed during ionization polymerization in fact authorize the use of material having a high coefficient of cubic expansion without adversely affecting the dimensional precision of the final element obtained.

Thus, it is possible to envisage the embodiment of large elements in economically and industrially acceptable conditions.

Depending on the morphology and dimensions of the element, the latter shall be placed in front of the accelerator gun according to a suitable process, the element being borne by a suitably-adapted structure so as to be moved in space and carry out irradiation or bombardment in the desired conditions.

The mode of implementation described above concerns the embodiment of a sandwich structure, that is including a central core flanked on each side of a skin.

Of course, the method permits the production of structures reduced to a single skin mounted on a face of a support panel.

The production method is similar to the one described earlier, except that the second adhesive film and the second skin 4 are not placed on the support panel 2 and that the compacting of the skin 3/adhesive film/panel 2 assembly is alone used for about five hours and maintained and then followed by the ionization polymerization described earlier with respect to the unit 2-3-4. This compacting can take place with a high vacuum, such as a vacuum under an absolute pressure less than or equal to 0.02 MPa since there is then no risk of "telegraphing", the vacuumed bladder being directly pressed on the panel 2.

Finally, the invention is clearly not limited to the embodiments described above, but covers all possible variants.

This is why the, fibers of the skins can be selected from the group including carbon, glass, silica, silicon carbide fibers and also aramid fibers such as Kevlar. The fibers are unidirectional long fibers or mixed, such as silica carbide hybrids or even meshes or relatively short fibers with a random distribution.

The fiber laps can also be fabrics or mats and the laying down angles from one lap to another may be any and variable.

The support panel on which a skin is mounted on one face or two is generally made of a light material with good resistance to compression.

It may be a honeycomb or a carbon or phenolic foam.

The resins able to be used for impregnating the fibers and the link between the skins and the support panel can be any ionization polymerizable resin, especially certain acrylic or polysilane-based resins. Suitable resins are mentioned in the documents FR-2.693.465 and 2.698.636.

The mold 1 can be made of a non-metallic material, such as resinconcrete composite material, wood or plaster.

The values of the compacting vacuums and the compacting periods may of course vary according to the nature of the elements to be embodied and their constituents.

Finally, it is to be noted that the compactings can be carried out by applying a pressure and no longer a vacuum.

We claim:

1. A method for producing a high dimensional precision composite element using ionization polymerization, the element including a support panel flanked on at least one side with a skin fixed by an adhesive resin and including at least one lap of organic or mineral fibers and an organic linking matrix, said method including:

placing at least one lap of fibers preimpregnated with an ionization polymerizable resin on a mold to form the skin, the mold having a predetermined shape and dimensions for the element to be produced;

placing a film of an ionization polymerizable adhesive resin on the skin;

placing the support panel on the film to form a skin/film/panel unit, the support panel having a predetermined thickness;

compacting the skin/film/panel unit by applying a vacuum for a period of about 12 hours; and a determined time after the beginning of compacting, polymerizing the polymerizable resins while maintaining said compacting, by subjecting the skin/film/panel unit to ionization radiation.

2. A method according to claim 1, wherein:
the support panel constitutes a single piece of material.
3. A method according to claim 1, wherein:
the support panel is comprised of a plurality of pieces of material glued together.
4. A method according to claim 1, wherein:
said placing at least one lap of fibers on a mold to form a skin comprises placing a plurality of laps of fibers on a mold to form a skin.
5. A method according to claim 1, wherein:
the preimpregnated fibers comprise members selected from the group consisting of high modulus carbon, glass, silica, silicon carbide fibers, and aramid fibers.
6. A method according to claim 1, wherein:
the fibers are long fibers.
7. A method according to claim 1, wherein:
the fibers are short fibers.
8. A method according to claim 1, wherein:
the fibers are uniform.
9. A method according to claim 1, wherein:
the fibers comprise a mixture of different fibers.
10. A method according to claim 1, wherein:
the fibers are meshes in the form of laps of unidirectional fibers.
11. A method according to claim 1, wherein:
the fibers are in the form of laps of fabric.
12. A method according to claim 1, wherein:
the fibers are in the form of mat fibers.
13. A method according to claim 1, wherein:
said placing at least one lap of fibers on a mold to form a skin comprises superimposing several laps on the mold, each lap comprising fibers having the same orientation, the fibers of adjacent laps extending at an angle with respect to each other.
14. A method according to claim 1, wherein:
said placing at least one lap of fibers on a mold to form a skin comprises superimposing several laps on the mold, each lap comprising fibers having the same orientation, the fibers of adjacent laps extending at a right angle with respect to each other.

15. A method according to claim 1, wherein:
the resin comprises a member selected from the group consisting of acrylic resin and polysilane-based resin.
16. A method according to claim 1, wherein:
the support panel comprises a member selected from the group consisting of honeycomb type alveoli structures, phenolic foams, and carbon foams.
17. A method according to claim 16, wherein:
the support panel constitutes a single piece of material.
18. A method according to claim 16, wherein:
the support panel is comprised of a plurality of pieces of material joined together.
19. A method according to claim 1, wherein:
the support panel is at least partially flat.
20. A method according to claim 1, wherein:
the support panel is totally flat.
21. A method according to claim 1, wherein:
the support panel has a curved contour according to any predetermined geometry.
22. A method according to claim 1, wherein:
the mold is made from a material comprising a member selected from the group consisting of soft steel, aluminum alloy, plaster, wood, and resin concretes.
23. A method according to claim 1, further comprising:
compacting the skin or compacting the first lap of the skin in contact with the mold.
24. A method according to claim 1, wherein:
said placing at least one lap of fibers on a mold to form the skin comprises placing a plurality of laps of fibers on a mold to form the skin, the method further comprising compacting the skin after all of the laps of the fibers are placed on the mold.
25. A method according to claim 1, wherein:
said polymerizing the resin comprises subjecting the skin/film/panel unit to minimal successive doses of ionizing irradiation.
26. A method according to claim 1, wherein said compacting is maintained for a period of about five hours prior to polymerizing.
27. A method, for producing a high dimensional precision composite element using ionization polymerization, the element including a support panel flanked on both sides with a skin fixed by an adhesive resin and including at least one lap of organic or mineral fibers and an organic linking matrix, said method including:

placing at least one lap of fibers preimpregnated with an ionization polymerizable resin on a mold to form a first skin, the mold having a predetermined shape and dimensions for the element to be produced;

placing a first film of an ionization polymerizable adhesive resin on the first skin;

placing the support panel on the first film to form a first skin/first film/panel unit, the support panel having a predetermined thickness;

compacting the first skin/first film/panel unit by applying a vacuum;

placing at least one lap of fibers preimpregnated with an ionization polymerizable resin on the support panel to form a second skin and to form a first skin/first film/panel/second skin unit;

placing a second film of ionization polymerizable adhesive resin on a face of a first lap of the second skin before the second skin is placed on the support panel; and compacting the first skin/first film/panel/second film/ second skin unit by applying a vacuum; and a determined time after the beginning of compacting the first skin/first film/panel/second film/second skin unit, polymerizing the polymerizable resins, while maintaining this latter compacting, by submitting the first skin/first film/panel/second film/second skin unit to ionization radiation.

28. A method according to claim 27, wherein said compacting the first skin/first film/panel unit is maintained for a period of about five hours, and said compacting the first skin/first film/panel/second film/second skin unit is maintained for a period of about five hours prior to polymerizing.

29. A method for producing a high dimensional precision composite element using ionization polymerization, the element including a support panel flanked on both sides with a skin fixed by an adhesive resin and including at least one lap of organic or mineral fibers and an organic linking matrix, said method including:

placing at least one lap of fibers preimpregnated with an ionization polymerizable resin on a mold to form a first skin, the mold having a predetermined shape and dimensions for the element to be produced;

placing a first film of an ionization polymerizable adhesive resin on the first skin;

placing the support panel on the first film to form a first skin/first film/panel unit, the support panel having a predetermined thickness;

compacting the first skin/first film/panel unit by applying a vacuum;

placing a second film of ionization polymerizable adhesive resin on the support panel;

placing at least one lap of fibers preimpregnated with an ionization polymerizable resin on the second film to form a second skin and a first skin/first film/panel/second film/second skin unit;

compacting the first skin/first film/panel/second film/second skin unit by applying a vacuum; and a determined time after the beginning of compacting the first skin/first film/panel/second film/second skin unit, polymerizing the polymerizable resins, while maintaining this latter compacting, by subjecting the first skin/first film/panel/second film/second skin unit to ionization radiation.

30. A method according to claim 29, wherein:

said placing at least one lap of fibers on a mold to form a skin comprises placing a plurality of laps of fibers on a mold to form a skin; and said placing a second skin comprises placing a plurality of laps of fibers on the support panel.

31. A method according to claim 29, wherein:

the preimpregnated fibers comprise members selected from the group consisting of high modulus carbon, glass, silica, silicon carbide fibers, and aramid fibers.

32. A method according to claim 29, wherein:

the fibers are long fibers.

33. A method according to claim 29, wherein:

the fibers are short fibers.

34. A method according to claim 29, wherein:

the fibers are uniform.

35. A method according to claim 29, wherein:

the fibers comprise a mixture of different fibers.

36. A method according to claim 29, wherein:

the fibers are meshes in the form of laps of unidirectional fibers.

37. A method according to claim 29, wherein:

the fibers are in the form of laps of fabric.

38. A method according to claim 29, wherein:

the fibers are in the form of mat fibers.

39. A method according to claim 29, wherein:

said placing at least one lap of fibers on a mold to form a first skin comprises superimposing several laps on the mold, each lap comprising fibers having the same orientation, the fibers of adjacent laps extending at an angle with respect to each other.

40. A method according to claim 29, wherein:

said placing at least one lap of fibers on a mold to form a first skin comprises superimposing several laps on the mold, each lap comprising fibers having the same orientation, the fibers of adjacent laps extending at a right angle with respect to each other.

41. A method according to claim 29, wherein:

the resin comprises a member selected from the group consisting of acrylic resin and polysilane-based resin.

42. A method according to claim 29, wherein:

the support panel comprises a member selected from the group consisting of honeycomb type alveoli structures, phenolic foams, and carbon foams.

43. A method according to claim 42, wherein:

the support panel constitutes a single piece of material.

44. A method according to claim 42, wherein:

the support panel is comprised of a plurality of pieces of material joined together.

45. A method according to claim 29, wherein:

the support panel is at least partially flat.

46. A method according to claim 29, wherein:

the support panel is totally flat.

47. A method according to claim 29, wherein:

the support panel has a curved contour according to any predetermined geometry.

48. A method according to claim 29, wherein:

the mold is made from a material comprising a member selected from the group consisting of soft steel, aluminum alloy, plaster, wood, and resin concretes.

49. A method according to claim 29, further comprising:

compacting the first skin or compacting the first lap of the first skin in contact with the mold.

50. A method according to claim 29, wherein:

said placing at least one lap of fibers on a mold to form the first skin comprises placing a plurality of laps of fibers on a mold to form the first skin, the method further comprising compacting the first skin after all of the laps of the fibers are placed on the mold.

51. A method according to claim 29, wherein:

said polymerizing the resin comprises subjecting the skin/film/panel unit to minimal successive doses of ionizing irradiation.

* * * * *